United States Patent
Slotman (10) Patent No.: US 8,991,048 B2
(45) Date of Patent: Mar. 31, 2015

(54) ROTATING MACHINE AND METHOD OF ASSEMBLY THEREOF

(75) Inventor: Jan Slotman, Haaksbergen (NL)

(73) Assignee: Siemens Aktiengesellschaft, München (DE)

( * ) Notice: Subject to any disclaimer, the term of this patent is extended or adjusted under 35 U.S.C. 154(b) by 697 days.

(21) Appl. No.: 13/321,909

(22) PCT Filed: May 25, 2010

(86) PCT No.: PCT/EP2010/057151
§ 371 (c)(1),
(2), (4) Date: Feb. 3, 2012

(87) PCT Pub. No.: WO2010/136450
PCT Pub. Date: Dec. 2, 2010

(65) Prior Publication Data
US 2012/0121433 A1   May 17, 2012

(30) Foreign Application Priority Data
May 26, 2009 (EP) .................................. 09007025

(51) Int. Cl.
*B21K 25/00* (2006.01)
*F04D 29/20* (2006.01)
*F04D 29/26* (2006.01)
*F16D 1/08* (2006.01)
*F16D 1/09* (2006.01)

(52) U.S. Cl.
CPC .............. *F04D 29/20* (2013.01); *F04D 29/266* (2013.01); *F16D 1/0858* (2013.01); *F16D 1/09* (2013.01); *F16D 2001/0906* (2013.01)

USPC .................. 29/889.21; 415/216.1; 416/204 R (58) Field of Classification Search
CPC ... F04D 17/122; F04D 29/043; F04D 29/053; F04D 29/20; F04D 29/2222; F04D 29/266; F04D 29/286
USPC ........................ 415/199.2, 116, 211.2, 216.1; 416/204 R; 29/889.21, 889.22
See application file for complete search history.

(56) References Cited

U.S. PATENT DOCUMENTS

| 3,061,342 A | 10/1962 | Feller |
| 3,715,176 A | 2/1973 | Kerklo |
| 3,937,103 A * | 2/1976 | Kleinhans .................... 74/572.2 |

(Continued)

FOREIGN PATENT DOCUMENTS

| CN | 1914433 B | 5/2010 |
| DE | 37906 C | 3/1886 |

(Continued)

*Primary Examiner* — Ninh H Nguyen (57) ABSTRACT

A rotating machine and a method of assembly thereof is provided. The machine is a multi-stage rotating machine, such as a compressor, having a common shaft. The proposed method involves consecutively assembling the multiple stages. For each consecutive stage, the proposed method comprises mounting an impeller around a shaft along a tapered surface of contact on said shaft. Subsequently, the method includes applying a radially acting hydraulic pressure on said impeller to radially expand said impeller about an axis of said shaft. An axially acting hydraulic pressure is applied on said impeller to move said impeller relatively longitudinally along said tapered surface on the shaft. Subsequently, the method includes relieving said hydraulic pressures to cause said impeller to shrink radially and securely fit on to said shaft.

6 Claims, 6 Drawing Sheets

(56) References Cited

U.S. PATENT DOCUMENTS

| | | | | |
|---|---|---|---|---|
| 3,976,395 A | * | 8/1976 | Kalnin et al. | 415/199.2 |
| 4,375,926 A | * | 3/1983 | Feller | 403/15 |
| 4,456,396 A | * | 6/1984 | Damratowski | 403/15 |
| 4,800,311 A | * | 1/1989 | Weldon et al. | 310/178 |
| 5,882,178 A | | 3/1999 | Hudson et al. | |
| 2008/0138148 A1 | | 6/2008 | Landwehr | |

FOREIGN PATENT DOCUMENTS

| | | |
|---|---|---|
| DE | 7018465 U | 9/1970 |
| NL | 6806392 A | 11/1969 |

* cited by examiner

ROTATING MACHINE AND METHOD OF ASSEMBLY THEREOF

CROSS REFERENCE TO RELATED APPLICATIONS

This application is the US National Stage of International Application No. PCT/EP2010/057151, filed May 25, 2010 and claims the benefit thereof. The International Application claims the benefits of European application No. 09007025.1 filed May 26, 2009. All of the applications are incorporated by reference herein in their entirety.

FIELD OF INVENTION

The present invention relates to a rotating machine of the type including one or more impellers mounted on to a shaft, and in particular, to an improved method of assembly thereof.

BACKGROUND OF INVENTION

In rotating turbomachinery such as compressors, impeller wheels are mounted to a rotating shaft, which is driven at high rotational speed. The rotating shaft may be coupled to the shaft of motor or a turbine, deriving power therefrom. In some applications, a common integrated compressor/motor shaft may be used. During rotation of impellers under high load at a high rotational speed, thrust force generated by a high centrifugal force as well as a pressure differential appearing across each of the impellers is exerted on the impellers. To prevent an occurrence of slippage of the impellers on the shaft under the effect of this thrust force, there has been employed a method of fixedly mounting impellers on the main shaft by shrink-fitting instead of the conventional methods using spline keys, press fitting or the like means.

Conventionally, shrink-fitting of impellers on to the shaft is achieved by heating the impeller uniformly to a high temperature, causing the hole/opening of the impeller to radially expand. For example, the impeller is heat soaked in an oven to a temperature of about 257° F. (125° C.). The impeller is then removed from the oven and the shaft is inserted into the impeller hole. Upon cooling, the mass around the hole shrinks back to its original size and frictional forces create a highly secure fit.

However, shrink-fitting using heat provides limited flexibility in the assembly of the rotating machine since is only possible when the shaft is free and not already built in to the rest of the components of the rotating machine.

The document NL-A-6806392 discloses a method for hydraulically mounting a hub, such as a propeller, on to a conical portion of a shaft by pressured hydraulic fluid acting in radial and axial directions on the hub. However the arrangement as disclosed in the document is not suitable for hydraulically mounting multiple hubs on to the same shaft.

SUMMARY OF INVENTION

The object of the present invention is to provide an improved method for assembly of a multi-stage rotating machine.

The above object is achieved by the features of the independent claims.

The underlying idea of the present invention is to make it possible to assemble a multi-stage rotating machine by assembling the impeller wheels on the shaft of the rotating machine, such as a compressor, while the rest of the components are already in place. This is achieved by shrinking the impeller wheels one by one, using hydraulic tools, on to the shaft. In this method of assembly, the impeller is first mounted, manually or otherwise, around the shaft along a tapered surface of contact on the shaft. Hydraulic pressure is then used to radially expand the impeller and also axially move the same along the tapered surface. The hydraulic pressure is then released, causing the impeller wheel to radially shrink and fit on to the shaft due to frictional forces. Multiple stages of the rotating machine are consecutively assembled by shrink fitting the impellers one by one on the shaft. The proposed method of assembly can be used, for example when the shaft of the rotating machine is already mounted to a motor or a turbine shaft, or, in case of an integrated compressor/shaft, when the integrated compressor/motor shaft is already mounted into the motor/compressor housing. Further, the use of heavy lifting equipment is greatly minimized.

In a further embodiment, for assembly of each consecutive stage, the method further comprises mounting a diaphragm around said impeller fitted on to said shaft, said diaphragm being mounted as a single integral component, said diaphragm defining a return channel for fluid to a next downstream impeller of said rotating machine. In yet another exemplary embodiment, the proposed method comprises mounting an inter-stage seal over said shrink-fitted impeller fitted on to said shaft, said inter-stage seal being mounted as a single integral component. This allows manufacturing the inter-stage seals and the diaphragm in one piece, which is advantageous since it provides increased stiffness of these components and hence reduces the required design thickness of these components. It also provides a simple construction by minimizing the number of fastening components, such as bolts.

In a preferred embodiment, the application of said axially acting hydraulic pressure is performed intermittently, till said impeller is moved longitudinally to a final location of fit of said impeller on said shaft. This avoids fretting due to metal to metal contact arising from longitudinal movement of the impeller along the tapered surface of contact.

In one embodiment, the shaft further comprises a central hole along the axis of said shaft and a plurality of radial holes extending radially outwardly from said central hole to a location where said impeller is mounted around said shaft, said central hole adapted to accommodate a plug having a fluid communication port for transporting pressurized hydraulic fluid to said radial holes for applying said radially acting pressure on said impeller.

In an exemplary embodiment, the axially acting fluid pressure is applied by conducting pressurized hydraulic fluid through an annular port defined by annular-shaped sleeve disposed around said shaft.

BRIEF DESCRIPTION OF THE DRAWINGS

The present invention is further described hereinafter with reference to illustrated embodiments shown in the accompanying drawings, in which.

DETAILED DESCRIPTION OF INVENTION

Figure 1:
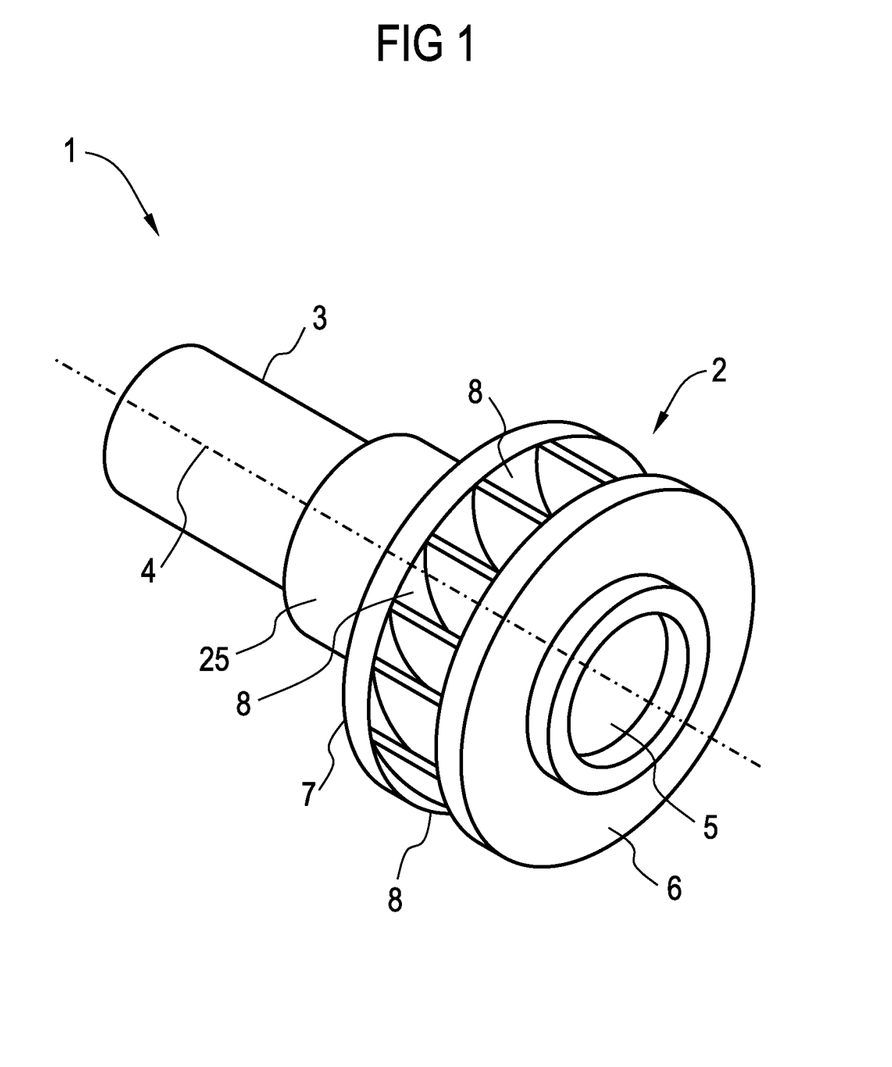
FIG. 1 is a perspective view of a portion of a rotor of a rotating machine having an impeller mounted on a shaft.

Referring now to the drawings, wherein like characters designate like or corresponding parts, there is shown in FIG. 1 a perspective view of a portion of a rotor 1 of a rotating machine, such as a compressor. The rotor 1 includes an impeller wheel 2 (hereinafter referred to as "impeller 2") mounted on to a shaft 3 about an axis 4. The impeller 2 forms a suction eye 5 through which fluid (i.e., gas) enters the impeller 2. The impeller 2 is formed by a front plate or shroud 6 and a rear plate or hub 7. The rear plate 7 abuts a sleeve portion 25, the inner surface of which forms the surface of contact with the shaft 3. A plurality of radial blades 8 extend between the rear plate 7 and the front shroud 6. In accordance with the present invention, the impeller 2 is shrink-fitted on to the shaft 3 by hydraulic tools as described hereinafter. The impeller 2 in the illustrated embodiment is a radial impeller of the closed type. It will be appreciated that the underlying idea of the present invention can be also extended to any other type of impellers, including axial impellers.

Figure 2:
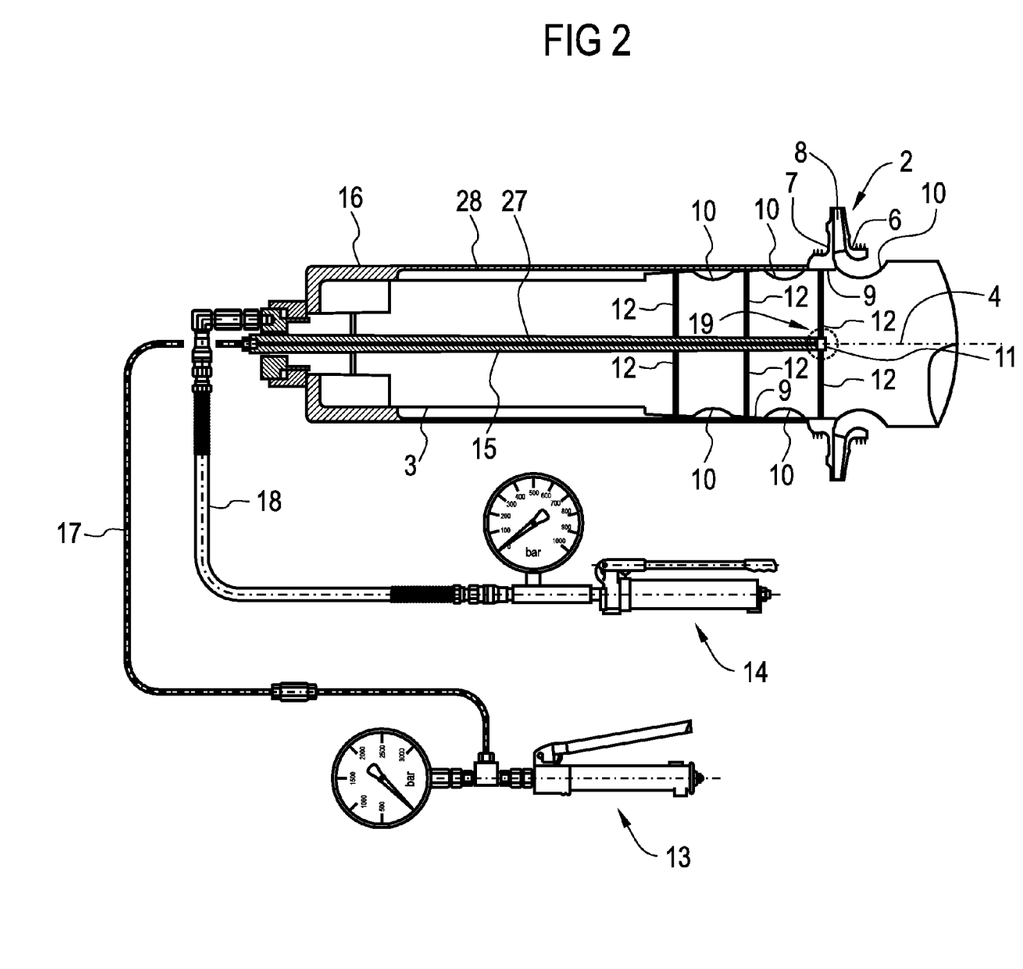
FIG. 2 is a schematic diagram of an arrangement to shrink an impeller on to a shaft using hydraulic tools, FIGS. 3A and 3B respectively illustrate the initial mounting position and the final fitting position of the impeller on the shaft.
Figure 3A:
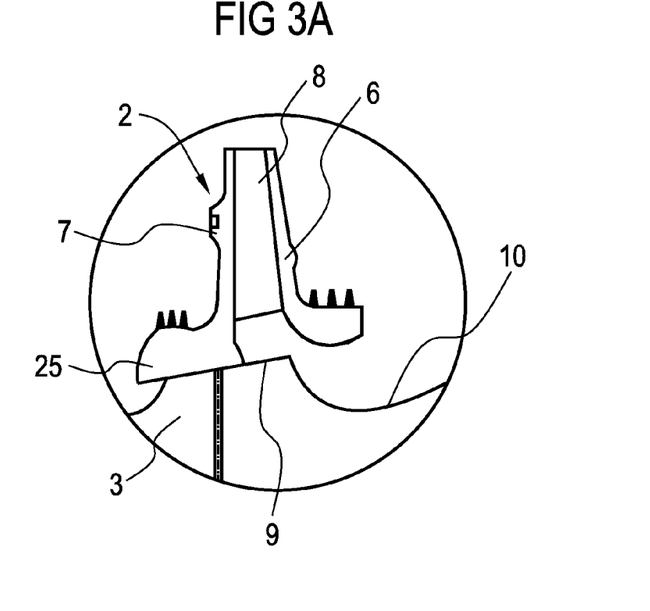

FIG. 2 illustrates an arrangement to effect a shrink-fit of the impeller 2 on to the shaft 3 using hydraulic tools according to one embodiment of the present invention. The impeller 2 is first mounted, manually or otherwise, around the shaft 3. The initial mounting position of the impeller 2 on the shaft 3 is shown in FIG. 3A. As illustrated in FIG. 2 and in greater detail in FIG. 3A, the portion of the shaft 3 where the impeller 2 is mounted has a tapered outer surface 9. This tapered outer surface 9 of the shaft 3 forms a surface of contact with the inner surface of the sleeve portion 25 of the impeller 2. The inner surface of sleeve 25 of the impeller 2 may be machined to have a taper that matches the taper of the surface 9. For a typical rotor having multiple impellers, the shaft 3 may be machined to have multiple such portions having tapered outer surfaces 9 interspaced by scalloped portions 10.

Referring back to FIG. 2, the shaft 3 has a central hole 11 extending along the shaft axis 4. At each impeller location multiple radial holes 12 (for example, four in number) are provided into the shaft 3 that extend radially outwardly from the central hole 11 to the location where the impeller 2 is mounted around the shaft 3. For mounting multiple impellers, multiple such radial holes 12 are provided at the respective mounting location of each impeller.

Figure 5A:
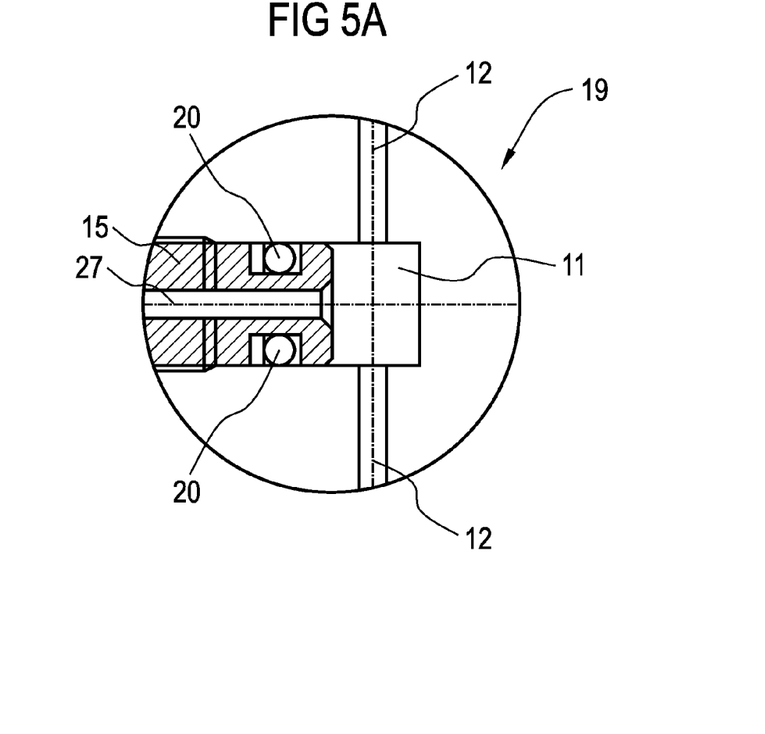
FIG. 5A is an enlarged view of the plug used in the embodiment of FIG. 2.

The shrink-fitting of the impeller 2 on the shaft 3 is effected by hydraulic actuating means, such as hydraulic pumps 13 and 14, and hydraulic mounting tools 15 and 16. The mounting tool 15 and the hydraulic pump 13 are used for effecting radial expansion of the impeller 2 around the shaft 3 using hydraulic pressure. The mounting tool 15 includes a plug inserted into the central hole 11 of the shaft 3. The plug 11 has a fluid conducting port 27 in fluid communication with radial holes 12 at the mounting location of the impeller 2. A pressure hose line 17, fitted to the hydraulic pump 13, transports pressurized hydraulic fluid (for e.g., oil) to the plug 15. The plug 15 is adapted to conduct the pressurized hydraulic fluid from the pump 13 through the port 27 to fill up the radial holes 12 at the location of the impeller 2, thus applying a radially acting pressure on the impeller 2, causing it to expand radially around the shaft 3. As shown in FIG. 5A, which is an enlarged view of the portion 19 in FIG. 2, an O-ring 20 is disposed around the plug 15 to prevent leakage of the hydraulic fluid through the hole 11 into the radial holes in the adjacent impeller mounting location on the shaft (i.e. to the left of the impeller 2 in FIG. 1).

Figure 3B:
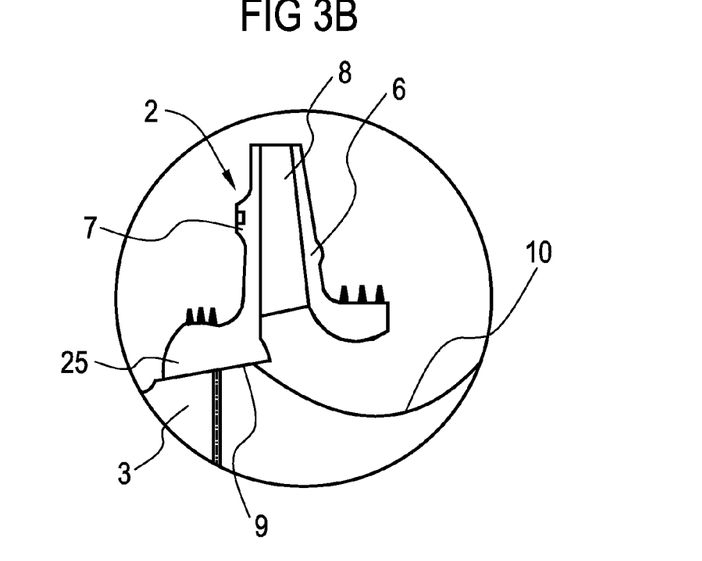

When the impeller 2 has radially expanded sufficiently to allow axial displacement of the impeller 2 along the shaft 3, an axially acting pressure is applied to the impeller 2 to move the impeller in a longitudinal direction along the taper of the shaft 3. This is effected by the mounting tool 16 and the hydraulic pump 14. The mounting tool 16 includes a sleeve disposed annularly around the shaft 3, and extending to the mounting location of the impeller 2. Pressurized hydraulic fluid (for e.g., oil) is supplied to the sleeve 16 via a pressure hose line 18 fitted to the hydraulic pump 14. The sleeve 16 defines an annular fluid conducting port 28 for axially conducting pressurized hydraulic fluid to the mounted impeller 2, applying an axially acting pressure on the impeller, causing it to move relatively longitudinally with respect to the shaft 3 along the tapered surface 9. As the impeller 2 moves up along the tapered surface 9, there is increased metal-to-metal contact between the inside surface of the sleeve portion 25 of the impeller 2 and the shaft 3. To avoid fretting between the metallic surfaces of the shaft 3 and the impeller 2, the axially acting pressure is applied intermittently, allowing sufficient radial expansion of the impeller each time, to minimize fretting between metal-to-metal contact. This process is continued till the impeller 2 moves up the tapered surface 9 to a final location of fit around the shaft 3, as shown in FIG. 3B. Subsequently, the hydraulic pressures are released, causing the impeller 2 to radially shrink around the shaft 3 wherein frictional forces create a highly secure fitment of the impeller 2 on the shaft 3.

Referring back to FIG. 2, the pumps 13 and 14 may be hydraulic pumps (for e.g., oil pumps) of the conventional type, comprising a valve gear block, a pressure distributor, control manometer, pressure ratio governor and a relief valve. Typically, the hydraulic pump 13 is a high-pressure pump operable to apply a radially acting pressure of 1000-2000 bars on the impeller 2, whereas the hydraulic pump 14 is a low-pressure pump operable to apply an axial pressure of about 500 bars on the impeller 2 during the shrink-fit process.

Figure 4:
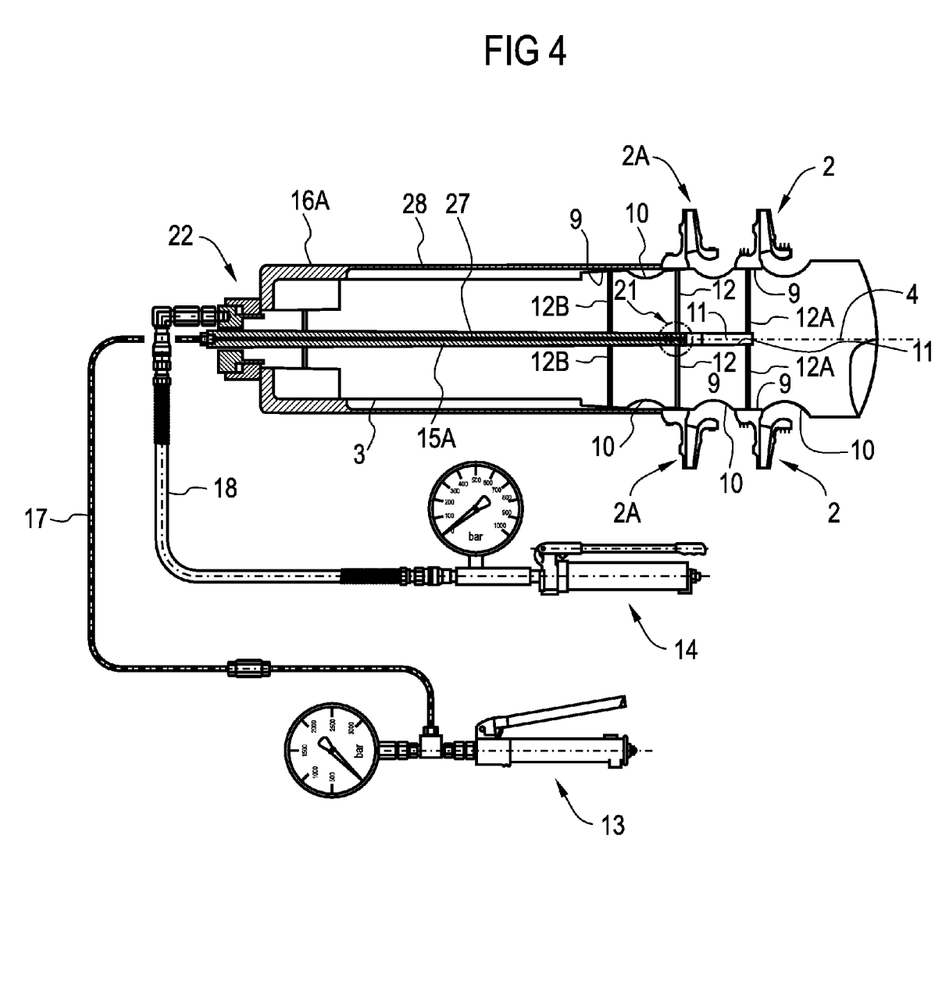
FIG. 4 is a schematic diagram of an arrangement to shrink a second impeller on to a shaft using hydraulic tools
Figure 5B:
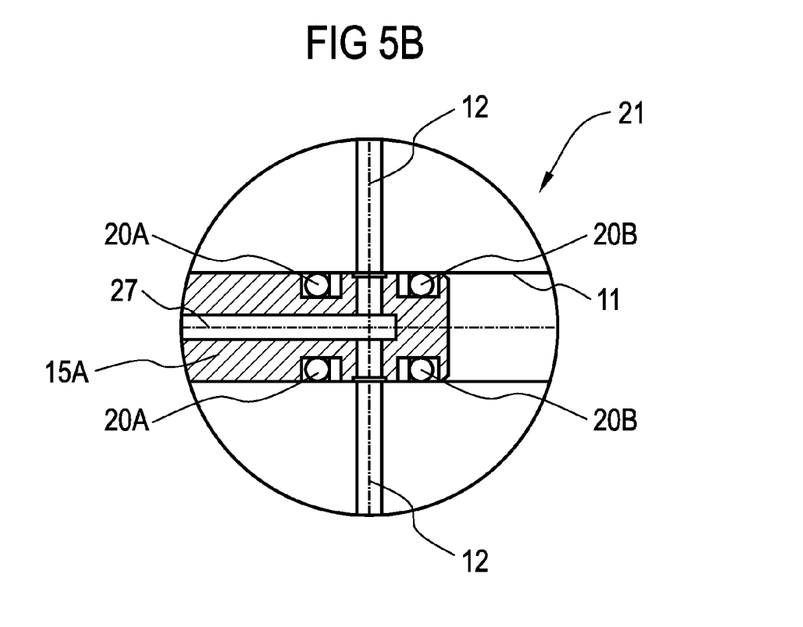
FIG. 5B is an enlarged view of the plug used in the embodiment of FIG. 4.

Using the above method, multiple impellers can be shrink-fitted one after the other on to the shaft 3. A different set of mounting tools are used for each impeller depending upon the location of the impeller. The impellers are assembled one by one in consecutive mounting locations from the farthest to the nearest location with respect to the end 22 of the shaft 3 from where the mounting tools are fitted thereupon. FIG. 4 illustrates an arrangement for shrink-fitting a second impeller 2A on to the shaft 3 using hydraulic tools after a first impeller 2 has already been shrink-fitted on to the shaft, the impeller 2A being substantially similar to the impeller 2. As can be seen, the set of mounting tools, i.e., the plug 15A and the sleeve 16A used for the impeller 2A are shorter in dimension to the mounting tools 15 and 16 used for fitting the impeller 2. The internal arrangement of the plug 15A is still different from that of the plug 15. This is illustrated in FIG. 5B, which is an enlarged view of the portion 21 in FIG. 4. Herein, as shown, two O-rings 20A and 20B are disposed around the plug 15A on either side of the radial holes 12 to prevent leakage of the hydraulic fluid through the hole 11 into the radial holes 12A and 12B in adjacent impeller mounting locations on either side.

Figure 6:
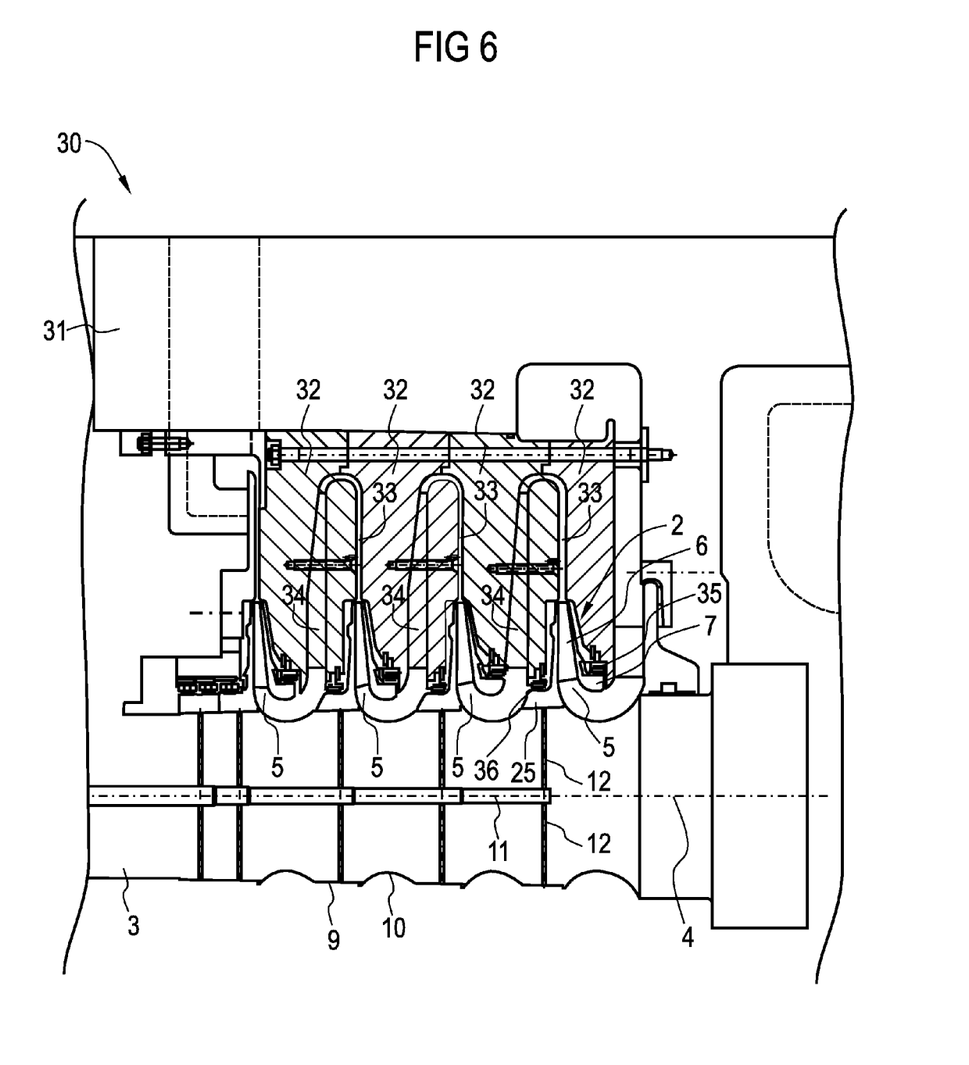
FIG. 6 is a longitudinal sectional view of a rotating machine assembled in accordance with the present invention.

FIG. 6 is a longitudinal sectional view of one half of a multi-stage rotating machine 30, for example, a compressor, assembled in accordance with the present invention. The compressor 30 includes a casing 31 that houses a rotor comprising multiple impellers 2 mounted on to a shaft 3 rotatable about an axis 4. Each stage of the compressor comprises an impeller 2 hydraulically shrink-fitted on to the shaft 3 as described before. Accordingly, for the purpose of mounting the impellers thereupon, the shaft 3 has a central hole 11 and radial holes 12 at each impeller location. Also, for each stage, a diaphragm 32 is disposed annularly around the impeller 2. The diaphragm 32 is the non-moving part between two stages of the compressor and contains the diffuser 33 and the return channel 34. For each stage, fluid (i.e., gas) enters through the eye 5 of the impeller 2. The return channel 32 guides the fluid into the eye 5 of the impeller 2 from the impeller in the adjacent upstream stage, and the diffuser 33, which may be vaned or vane-less, converts velocity of the gas into pressure.

In the proposed method of assembly, the impellers 2 may be hydraulically shrink-fitted one by one while the shaft 3 is already mounted into the casing 31. Subsequent to hydraulically shrink fitting an impeller 2 on to the shaft 3 and prior to mounting the next adjacent impeller on to the shaft 3, it is possible to mount the diaphragms 32 in one-piece, i.e. as single integral component, annularly around the shrink-fitted impeller 2 of the respective stage. In case of heat based shrink-fitting of the impellers, all the impellers are assembled on to the shaft before the shaft is mounted into the casing, which makes it difficult to mount the diaphragms in one-piece. The proposed method of hydraulic shrink-fitting of impellers on to the shaft thus makes it possible to manufacture the diaphragms 32 in one piece, which provides increased stiffness to the diaphragm. This is advantageous since the diaphragm is subject to severe axial rubs due to excessive continuous surge of the gas. Manufacturing the diaphragms in one piece reduces the design requirement of the thickness of the diaphragms.

The assembly of a stage of the compressor 30 also comprises mounting of inter-stage seals comprising an eye seal 35 and a shaft seal 36 over the shrink-fitted impeller 2. The eye-seal 35 is a ring shaped sealing element mounted about the front shroud 8 of the impeller 2 and is adapted to minimize leakage of fluid from the diffuser 33 to the inlet of the impeller 2, while the shaft seal 36 is a ring shaped sealing element mounted about the sleeve 25 of the impeller 2 and is adapted to minimize fluid leakage to the inlet of the impeller of the next stage. Like in case of the diaphragms 32, and for similar reasons, it is possible to mount the inter-stage seals 35 and 36 as ring-shaped integral components over the impeller 2 of the respective stage. This makes it possible to manufacture each inter-stage seal 35 and 36 in one-piece, which provides increased stiffness to these seals. Mounting the diaphragms and the inter-stage seals in one piece also provides a simple construction by minimizing the number of fastening components, such as bolts. The above process of shrink-fitting the impeller 2 and subsequently mounting the diaphragm 32 and the inter-stage seals 35 and 36 (each as single integral components) is repeated for each stage, thus completing the assembly process of the compressor 30.

Summarizing, the present invention relates to a rotating machine and a method of assembly thereof. The proposed method comprises mounting an impeller around a shaft along a tapered surface of contact on said shaft. Subsequently, the method includes applying a radially acting hydraulic pressure on said impeller to radially expand said impeller about an axis of said shaft. An axially acting hydraulic pressure is applied on said impeller to move said impeller relatively longitudinally along said tapered surface on the shaft. Subsequently, the method includes relieving said hydraulic pressures to cause said impeller to shrink radially and securely fit on to said shaft.

Although the invention has been described with reference to specific embodiments, this description is not meant to be construed in a limiting sense. Various modifications of the disclosed embodiments, as well as alternate embodiments of the invention, will become apparent to persons skilled in the art upon reference to the description of the invention. It is therefore contemplated that such modifications can be made without departing from the spirit or scope of the present invention as defined by the below-mentioned patent claims.

The invention claimed is:

1. A method for assembling a multi-stage rotating machine having a common shaft, comprising:
    assembling each of the multiple stages one after the other on the shaft, wherein the assembly of each stage comprises:
        mounting an impeller around the shaft along a tapered surface of contact on the shaft,
        applying a radially acting hydraulic pressure on the impeller to radially expand the impeller about an axis of the shaft,
        applying an axially acting hydraulic pressure on the impeller to move the impeller relatively longitudinally along the tapered surface on the shaft, and
        relieving the hydraulic pressures to cause the impeller to shrink radially and securely fit on to the shaft,
        wherein, for a respective stage, applying the radially acting hydraulic pressure comprises axially inserting a respective plug within a central axial hole in the shaft and conducting pressurized hydraulic fluid through a fluid conducting port inside the plug, said respective plug being adapted in relation to an impeller mounting location for the respective stage such that the fluid conducting port of the respective plug leads the pressurized hydraulic fluid to a plurality of radially outward extending holes that connect the central axial hole to the mounting location of the impeller for the respective stage.

2. The method according to claim 1, wherein the assembly of each consecutive stage further comprises mounting a diaphragm annularly around the impeller fitted on to the shaft, the diaphragm being mounted as a single integral component, the diaphragm defining a return channel for fluid to the impeller from an adjacent upstream stage of the rotating machine.

3. The method according to claim 1, wherein the assembly of each stage further comprises mounting an inter-stage seal over the shrink-fitted impeller fitted on to the shaft, the inter-stage seal being mounted as a single integral component.

4. The method according to claim 1, wherein the application of the axially acting hydraulic pressure is performed intermittently, till the impeller is moved longitudinally to a final location of fit of the impeller on the shaft.

5. The method according to claim 1, wherein applying the axially acting fluid pressure comprises conducting pressurized hydraulic fluid through an annular fluid conducting port defined by a sleeve disposed annularly around the shaft, the annular fluid conducting port defined by the sleeve extending axially to a location where the impeller is mounted around the shaft.

6. The method according to claim 5, wherein a separate plug and a separate sleeve is used for each impeller, based upon a mounting location of each impeller on the shaft.

* * * * *